April 2, 1935.　　　　　E. A. SIPP　　　　　1,996,126
AIRPLANE LANDING LIGHT
Filed March 27, 1933　　　2 Sheets-Sheet 1
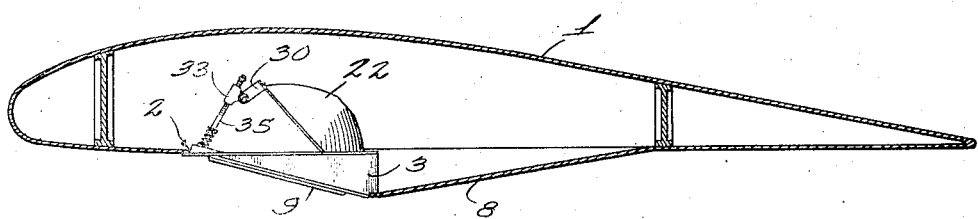
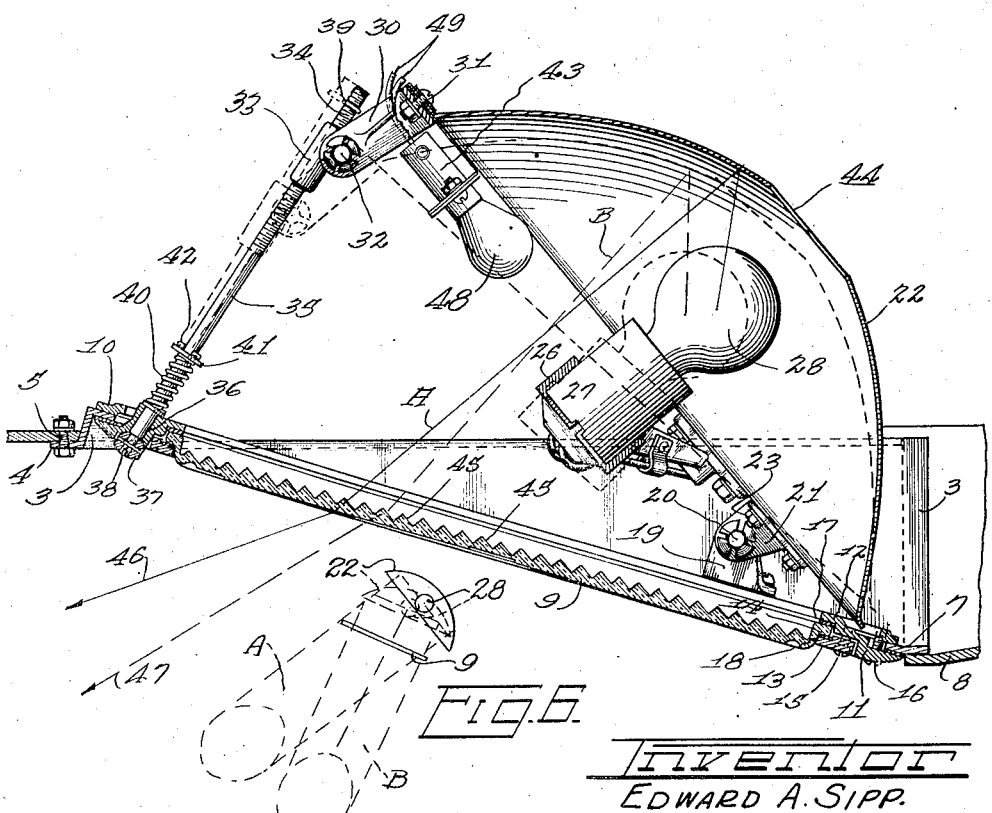
Inventor
EDWARD A. SIPP.

April 2, 1935.   E. A. SIPP   1,996,126
AIRPLANE LANDING LIGHT
Filed March 27, 1933   2 Sheets-Sheet 2
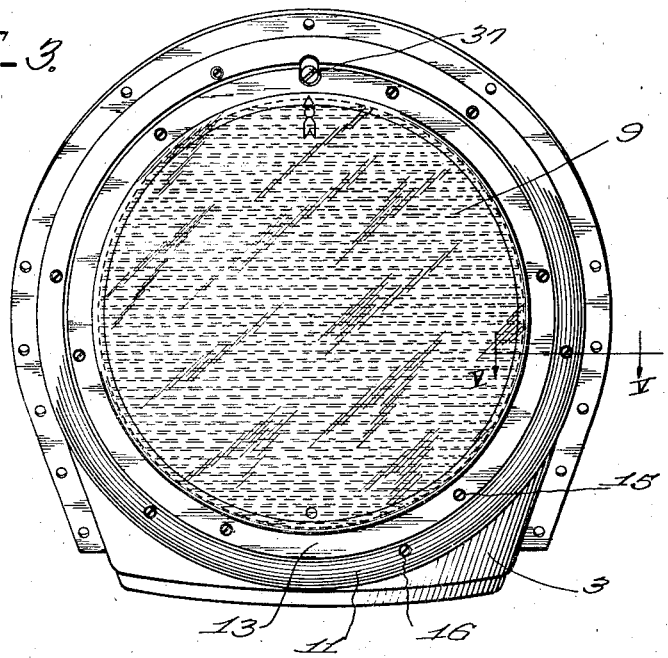
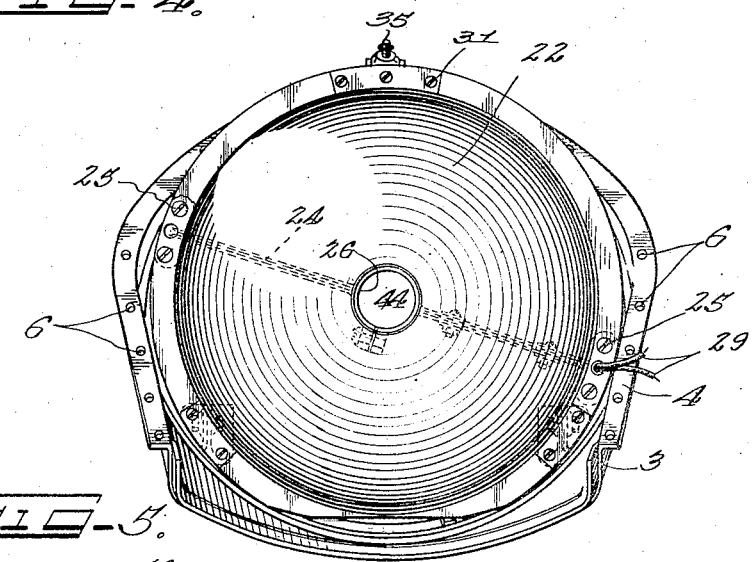
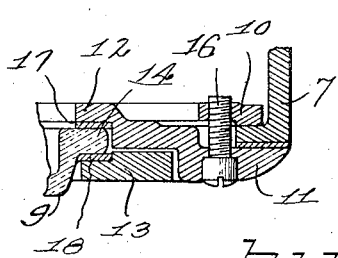
Inventor
EDWARD A. SIPP.

Patented Apr. 2, 1935

1,996,126

UNITED STATES PATENT OFFICE 1,996,126

AIRPLANE LANDING LIGHT

Edward A. Sipp, Oak Park, Ill., assignor to The Pyle-National Company, Chicago, Ill., a corporation of New Jersey Application March 27, 1933, Serial No. 663,040

4 Claims. (Cl. 240—7.7)

The present invention relates to airplane landing lights and particularly to one which may be constructed in quantity production and applied to or installed in any type of airship, and when installed, can be adjusted to provide proper illumination for landing purposes of the particular ship.

The invention contemplates and has for an object, the provision of a landing light which is of the non-retractable type and is one which is permanently fixed in the plane's surface and is streamlined.

A further object of the invention is to provide an airplane landing light wherein the light beams are bent by refraction.

The above other and further objects of the invention will be apparent from the following description, accompanying drawings and appended claims.

An advantage in the present invention resides in the fact that it is so constructed and installed in the ship structure as to offer little if any wind resistance to the progress of the ship. Wind tunnel tests of airplanes equipped with landing lights of the present invention show that there is no effect at any or all plane speeds. These tests show that any error in calculation with respect to the effect on the lift or drag of the plane wing equipped with the type of light of the present invention, is within the experimental error of the tunnel itself, and therefore negligible.

Another disadvantage of the retractable type of light, which may be mentioned, is the fact that usually these are controlled from the cockpit making it necessary for the pilot to manipulate the retractable light and this sometimes becomes necessary when he is busily engaged in the operation of the ship when, for instance, conditions are such as not to afford smooth sailing. A pilot has but two hands and two feet and usually all are busily engaged in operating the controls of a plane when landing the same, and to require the additional movement necessary on the part of the pilot to actuate the retractable light sometimes works a hardship, with the result that sometimes the lights are not utilized causing a bumpy landing.

The accompanying drawings illustrate an embodiment of the present invention and the views thereof are as follows:

Figure 1 is a longitudinal vertical sectional view taken through a wing of an airplane equipped with a landing light embodying principles of the present invention.

Figure 2 is a longitudinal vertical sectional view through the landing light of the present invention, showing in full lines the light source and reflector supported in adjusted position so that the light beams strike certain of the faces of the prismatic lens in perpendicular relationship and in dotted lines one of the different positions to which the light source and reflector may be moved to change the light beam emanating from the lens.

Figure 3 is a front elevational view of a landing light embodying principles of the present invention.

Figure 4 is a view of the interior of the light, with the lens and light source removed.

Figure 5 is a fragmental enlarged sectional view taken substantially in the plane of line V—V of Figure 3.

Figure 6 is a diagrammatic view showing different angular relationships, with respect to the lens' surface of the issuing beams of light depending on the position of the reflector with respect to the lens and showing variation in the transverse dimensions of these beams in a direction of the length of the airship.

The drawings will now be explained.

Figure 1 illustrates a sectional view of an airplane wing 1 having an aperture 2 formed in its lower surface. A member 3 having a flange 4 is secured against the underside of the wing about the aperture 2 and is secured in position by bolts 5, the flange 4 being provided at intervals with bolt openings 6. In vertical section this member 3 is triangular, tapering from the front margin to the rear margin. The lower portion of this frame member 3 is provided with a flange 7, the plane of which is inclined toward the flange 4. The member 3 is installed in the aperture 2 with the flange 7 inclined toward the adjacent plane surface in direction of the forward movement of the airplane or ship. Fairing 8 extends rearwardly from the member 3 for streamlining the landing light.

The flange 7 defines a circular opening in which is mounted a lens 9 supported on a lens mounting ring 10 which rests on the flange 7 of the member 3. A ring 11 overlies the outer surface of the flange 7 and is provided with an internal flange 12 against which rests the lens 9. A ring 13 bears against the flange 14 of the lens and retains the lens between the inner flange 12 of the ring 11 and the ring 13. The ring 13 is retained in position by means of screws 15 inserted at intervals in the ring 13 and engaging threaded openings in the ring 11. The ring 11, in turn, is secured against the flange 7 of the member 3 by screws 16 in threaded engagement with the lens mounting ring 10. Suitable gaskets 17 and 18 are interposed between the flange 14 of the lens, and the inner shoulder of flange 12 and the ring 13, respectively.

Upstanding from the ring 10 are hinge brackets 19 to which are pivotally attached as by hinge pins 20 lugs 21 formed as a part or support for the reflector 22. The lugs 21 are secured to the flange of the reflector 22 by bolts 23, or any other suitable fastening means.

The hinge connection of the reflector to the ring 10 is disposed near the rear portion of the member 3.

Extending transversely of the reflector 22 is a bracket 24, which, at its outer ends, is secured to the flange of the reflector 22 as by bolt 25. The bracket 24 carries a support 26 for an electric light socket 27, said socket in turn removably carrying an electric light bulb 28. The bracket 24 and the socket 27 are so disposed and arranged that when the electric light bulb 28 is inserted in the socket 27, the light will be at the focus of the reflector, which is a parabolic reflector.

Electric wires 29 are carried by the bracket 24 and suitably connected with the socket 27 and lead from a switch interposed in an electrical circuit for supplying energy to the bulb 28.

The forward or upper margin of the reflector 22 has attached to it a bracket 30, as by screw 31, which bracket is pivotally connected by pins or bolt 32 to a slide or sleeve 33, the inner surface of which is threaded to engage the threaded portion 34 of an adjusting bolt 35. The adjusting bolt 35 is supported in a bearing 36 formed as part of the lens retaining ring 10 and is provided with a head 37 which, in the present instance, is provided with a screw driver slot 38 for receiving a screw driver for the purpose of rotating the screw in either direction to move the slide 33 axially along the adjusting bolt 35, for the purpose of adjusting the reflector 22 with respect to the lens 9. The bolt 35 is provided with a stop 39 secured to it near its free end for limiting movement of the slide or sleeve 33 in that direction. The adjusting bolt 35 is maintained in its bearing 36 by means of a spring 40 which surrounds a portion of the bolt and has bearing against the inner surface of the bearing 36 and likewise against a disk 41 secured in position along the bolt by a pin 42. The spring 40 serves the additional purpose of a resilient support for the reflector 22 and its connected parts.

Secured to the bracket 30 is a socket 43 for a navigation light 48. Electrical conductors 49 lead to the socket 43 thence to a switch interposed in a suitable electric circuit. A navigation light 48 is combined with the landing light of the present invention.

It is usual to install two landing lights, at least, on an airship—one on the right side of the ship and the other on the left side. Present flying regulations require that navigation lights be shown at night, the navigation light for the right hand one being green and the left hand one red.

The reflector 22 is provided with a centrally disposed opening 44 through which the bulb 28 may be removed and a new one inserted in the socket 27, as occasion demands.

The lens 9 of the present invention is illustrated as a prismatic lens with the prisms formed in saw tooth formation.

The screw 35 is adjusted, at the time the light is assembled, so that the rays reflected by the reflector 22 strike the prismatic surfaces 45 of the lens perpendicularly to such surfaces, as represented by A in Figure 2. The rays emanating from the lens are bent by refraction. Such a bent ray is represented at 46, where its angular direction, with respect to the direction thereof between the reflector 22 and the lens has been changed by passing through the lens. The amount of adjustment of the light source and reflector with respect to the lens determines the angularity of the vertical rays emanating from the lens.

It sometimes happens that when landing lights embodying the principles of the present invention are installed in airplanes of various types, of which there are monoplanes, biplanes and triplanes and in which the wings are of varying height, it becomes necessary to adjust the light source with respect to the lens to secure maximum illuminating surface for landing purposes.

In order to accomplish this purpose, the lights may be adjusted by manipulating the adjusting screw 35 exteriorly of the lens 9 by the engagement of a screw driver with the heads 37 of the adjusting screws or bolts 35. If it is desirable to change the illuminated area underneath the airship, then the screws 16 are loosened and the lens supporting ring 10 is rotated in either direction, as may be desired, carrying with it the reflector 22, the bracket 24 and the lens 9, until the desired width of the illuminated area is reached. When this has been accomplished the screws 16 are tightened and the lens, light source and reflector, are thus retained in such adjusted position.

Inclination of the lens 9 toward the adjacent surface of the airship in direction of forward movement of the same in combination with the fairing 8 streamlines the landing light to such extent that no appreciable effect on the forward movement of the ship is experienced, at any speed.

The lens 9 is illustrated as a prismatic lens, that is a lens wherein the opposed surfaces are in angular relationship, whereby the light beam is bent by refraction.

In Figure 2 there is illustrated a light beam A striking one of the surfaces 45 of the prismatic lens 9 at 90°. The direction of the issuing refracted ray 46 has been computed and, as shown in the drawings, is correct in its angular relationship to the outer surface of the lens. The computations have been based on the angularity of the faces 45 of the lens as being substantially at 33° with respect to the plane of the outer face.

The ray or beam B is a beam issuing from the light source 28 when the source has been adjusted toward the lens 9. The beam B strikes the inclined surface 45 at an angle, in counterclockwise direction, greater than 90°. This angle has been determined as 99° and the refracted portion thereof 47 is at an angle of 47° with respect to the plane of the outer surface of the lens 9.

It is to be understood that the light source may be adjusted either way, up or down, from the full line position of Fig. 2. Adjustment of the light source 28 away from the lens 9 will change the angular direction in which rays strike the surfaces 45 of the lens 9 and will thus change the vertical direction of the issuing beam. In this manner it is possible to vary the vertical height of the beam emanating from the lens 9.

It is to be understood that in all such movements of adjustment the light source and reflector move together and remain at all times in fixed relationship to each other.

The adjustment provided by the light of the present invention lends itself very readily to adaptation of landing lights to airships of commercial airlines. The commercial airlines require that the landing light be set for certain angle and range and when once set, must not be changed.

The landing light of the present invention lends itself very readily for application to airships in such manner as to offer little if any resistance to wind pressure. The manner of constructing, applying and installing the lights of the present invention results in a streamline arrangement which, by wind tunnel tests, has been ascertained to have no effect whatsoever on an airship at any speed.

The landing lights, as well as the navigation lights, are turned on and off by the pilot who operates electrical switches disposed in convenient positions in the cockpit. All he has to do is to actuate the switches to turn on or off the lights and at no time is concerned with the necessity of having to adjust the landing lights in proper manner for landing purposes.

The lens 9 and fairing 8 constitute a streamlined protuberance formed in the ship or plane structure, with the lens as the forward end.

The invention has been described herein more or less precisely as to details, yet it is to be understood that the invention is not to be limited thereby, as changes may be made in the arrangement and proportion of parts and equivalents may be substituted without departing from the spirit and scope of the invention.

The invention is claimed as follows:

1. A landing light for an airship, including in combination, a ring member adapted to be secured in an aperture in said ship with its plane in fixed angular relationship to said ship, a refractory lens supported by said ring member and maintained in angular relationship to the ship and rotatable about its axis in the plane of the lens, a light source and reflector supported by said ring member, mounting means for said light source and reflector adapted to maintain the same in fixed relationship to each other, and means whereby said mounting means may be angularly adjusted with respect to said lens and means whereby said lens may be rotated to vary the direction of the beam issuing from said lens.

2. A landing light for an airship including in combination, a lens inclined against the under side of a portion of the ship to reduce wind resistance and to throw the light downwardly and forwardly, said lens being rotatably adjustable about its axis and in its own plane to alter the direction of the issuing light beam with respect to the ship, and a reflector and light source rotatable with said lens and rockable toward and away from said lens to alter the beam vertically.

3. In combination with an airplane having an opening in it for a landing light; of a landing light structure inserted in said opening; said structure including a prismatic lens inclined against the under side of said plane to reduce wind resistance and to throw the light downwardly and forwardly; a ring surrounding said lens and securing it in position in the plane opening; a reflector and light source connected together for unitary movement; a pivotal connection between said reflector and said ring whereby said light source and reflector may as a unit be rocked toward and away from said lens; said reflector being mounted so that its axis is inclined downwardly and forwardly of the plane; said lens, ring and connected reflector and light source being rotatable in the plane of said ring to vary the direction of the issuing beam of light with respect to the plane; means for securing said ring and its associate elements in rotatively adjusted position; and means swingable with said ring for rocking said reflector and light source with respect to the lens.

4. In combination with an airplane having an opening in it for a landing light, of a landing light structure adjacent said opening, said structure including a prismatic lens closing said opening and inclined against the under side of the airplane to reduce wind resistance and to throw the light beam downwardly and forwardly, said lens being mounted in fixed angular relationship with respect to the airplane and adapted for rotative movement about its axis and in its fixed angular plane, a reflector and light source connected together for unitary movement, said reflector and light source being mounted for rocking movement toward and away from said lens and so that the reflector axis is inclined downwardly and forwardly of the airplane, said lens and the reflector and light source being rotatable in the plane of said lens to vary the direction of the issuing beam of light with respect to the airplane, and means swingable with the lens as it is rotated about its axis for rocking said reflector and light source with respect to the lens.

EDWARD A. SIPP.